US009025201B2

(12) United States Patent
Tao

(10) Patent No.: US 9,025,201 B2
(45) Date of Patent: May 5, 2015

(54) IMAGE PROCESSING APPARATUS AND IMAGE PROCESSING METHOD

(71) Applicant: KYOCERA Document Solutions Inc., Osaka-shi, Osaka (JP)

(72) Inventor: Kozo Tao, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 13/967,093

(22) Filed: Aug. 14, 2013

(65) Prior Publication Data

US 2014/0055798 A1 Feb. 27, 2014

(30) Foreign Application Priority Data

Aug. 23, 2012 (JP) ................................ 2012-184579

(51) Int. Cl.
G06F 15/00 (2006.01)
G06K 1/00 (2006.01)
H04N 1/60 (2006.01)
H04N 1/64 (2006.01)
H04N 1/40 (2006.01)
H04N 1/50 (2006.01)

(52) U.S. Cl.
CPC ................ H04N 1/646 (2013.01); H04N 1/40 (2013.01); H04N 1/504 (2013.01)

(58) Field of Classification Search
None
See application file for complete search history.

(56) References Cited

U.S. PATENT DOCUMENTS

2007/0242297 A1* 10/2007 Eki ................................ 358/1.9
2008/0037882 A1* 2/2008 Tamura et al. ................ 382/232

FOREIGN PATENT DOCUMENTS

JP 2002262115 A 9/2002
JP 2007282027 A 10/2007
JP 2008042688 A 2/2008

OTHER PUBLICATIONS

European Patent Office, Extended European Search Report of EP13180717.4, Nov. 22, 2013, Germany, 6 pages.

* cited by examiner

Primary Examiner — Vincent Rudolph
Assistant Examiner — Michael Burleson
(74) Attorney, Agent, or Firm — Alleman Hall McCoy Russell & Tuttle LLP

(57) ABSTRACT

An image processing apparatus includes bus, adding portion, image processing portion, and output processing portion. In the case where document sheet data as a processing target is monochrome image data, the adding portion outputs, to the bus, color image data obtained by adding, to the monochrome image data, dummy image data pieces for a plurality of colors each corresponding to a predetermined processing unit amount which corresponds to a part of the monochrome image data. The image processing portion performs image processing per data amount equal to or smaller than the processing unit amount and outputs the resultant data to the bus. The output processing portion outputs image data pieces for a plurality of colors included in the color image data processed by the image processing and acquired from the bus, in accordance with synchronization signals inputted for the respective image data pieces for the plurality of colors.

7 Claims, 6 Drawing Sheets

IMAGE PROCESSING APPARATUS AND IMAGE PROCESSING METHOD

INCORPORATION BY REFERENCE

This application is based upon and claims the benefit of priority from the corresponding Japanese Patent Application No. 2012-184579 filed on Aug. 23, 2012, the entire contents of which are incorporated herein by reference.

BACKGROUND

The present disclosure relates to an image processing apparatus and an image processing method that perform various types of image processing for color image data and monochrome image data.

An image processing apparatus such as a printer or a multifunction peripheral that supports color printing prints a monochrome image or a color image on a paper sheet based on monochrome image data or color image data inputted as image data (hereinafter, referred to as "document sheet data") of a document sheet that is a print processing target. As an image processing apparatus of this type, a configuration having a so-called tandem-type image forming portion in which photosensitive drums respectively corresponding to four colors of C (cyan), M (magenta), Y (yellow), and K (black) are provided in series, is known. It is noted that respective toner images formed on the photosensitive drums corresponding to C, M, Y, and K are transferred onto an intermediate transfer belt in an overlapping manner, and then transferred from the intermediate transfer belt onto a paper sheet.

In addition, the image processing apparatus may be provided with a main control portion that performs overall control for the entire apparatus, and an engine control portion that controls the operation of an image forming portion. The main control portion includes an image processing portion that performs various types of image processing such as rotation processing, halftone processing, or size cut processing for image data. It is noted that the main control portion uses a storage memory such as an SDRAM, as a working area.

On the other hand, the engine control portion executes a color print operation using the respective photosensitive drums for C, M, Y, and K in the case where document sheet data is color image data, and executes a monochrome print operation using only the photosensitive drum for K in the case where document sheet data is monochrome image data. Specifically, upon the monochrome print operation, the engine control portion separates the photosensitive drums for C, M, and Y from the intermediate transfer belt.

In addition, in the case where document sheet data is mixed document sheet data including both monochrome image data and color image data, the engine control portion selectively executes one of the monochrome print operation and the color print operation so as to reduce a print time as much as possible. That is, even if document sheet data is monochrome image data, the engine control portion may execute the color print operation. Therefore, in the case where document sheet data is monochrome image data, the main control portion generates color image data by adding dummy image data pieces for C, M, and Y to the monochrome image data. Thus, image data inputted to the engine control portion is always color image data, and therefore the engine control portion can optionally execute one of monochrome print operation and color print operation.

Here, FIGS. 7A and 7B are diagrams for explaining a print operation in the case where document sheet data is monochrome image data. FIG. 7A shows an output timing of color image data in the case where the color print operation is executed, and FIG. 7B shows an output timing of color image data in the case where the monochrome print operation is executed. The color image data is generated by the main control portion and stored into the SDRAM of the main control portion.

First, as shown in FIG. 7A, upon the color print operation, the engine control portion sequentially reads image data pieces for respective colors of C, M, Y, and K from the SDRAM of the main control portion at predetermined timings in accordance with the placement intervals among the respective photosensitive drums. In this case, the same print time as in the case where document sheet data is color image data is required.

On the other hand, as shown in FIG. 7B, upon the monochrome print operation, the engine control portion simultaneously reads image data pieces for respective colors of C, M, Y, and K from the SDRAM of the main control portion. In this case, since the image data pieces for respective colors of C, M, Y, and K are simultaneously outputted, the print operation is executed in a shorter time than in the case of the color print operation.

SUMMARY

An image processing apparatus according to one aspect of the present disclosure includes a bus, an adding portion, an image processing portion, and an output processing portion. The bus transmits data therethrough. In the case where document sheet data as a processing target is monochrome image data, the adding portion outputs, to the bus, color image data obtained by adding, to the monochrome image data, dummy image data pieces for a plurality of colors each corresponding to a predetermined processing unit amount which corresponds to a part of the monochrome image data. The image processing portion performs image processing per data amount equal to or smaller than the processing unit amount and outputs the resultant data to the bus. The output processing portion outputs image data pieces for a plurality of colors included in the color image data processed by the image processing and acquired from the bus, in accordance with synchronization signals inputted for the respective image data pieces for the plurality of colors.

An image processing method according to another aspect of the present disclosure is an image processing method executed by a computer provided in an image processing apparatus that includes a bus, an image processing portion, and an output processing portion. The image processing method includes a determination step and an adding step. The bus transmits data therethrough. The image processing portion performs image processing per data amount equal to or smaller than a predetermined processing unit amount and outputs the resultant data to the bus. The output processing portion outputs image data pieces for a plurality of colors included in color image data processed by the image processing and acquired from the bus, in accordance with synchronization signals inputted for the respective image data pieces for the plurality of colors. The determination step determines whether or not the document sheet data as a processing target is monochrome image data. In the case where it is determined that the document sheet data is monochrome image data, the adding step outputs, to the bus, color image data obtained by adding, to the monochrome image data, dummy image data pieces for a plurality of colors each corresponding to the processing unit amount which corresponds to a part of the monochrome image data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First, with reference to FIG. 1, the schematic configuration of a multifunction peripheral 10 according to an embodiment of the present disclosure will be described. It is noted that the multifunction peripheral 10 is merely an example of an image processing apparatus according to the present disclosure, and the present disclosure can be also applied to image processing apparatuses such as a printer, a facsimile apparatus, a scanner, and a copy machine.

Figure 1:
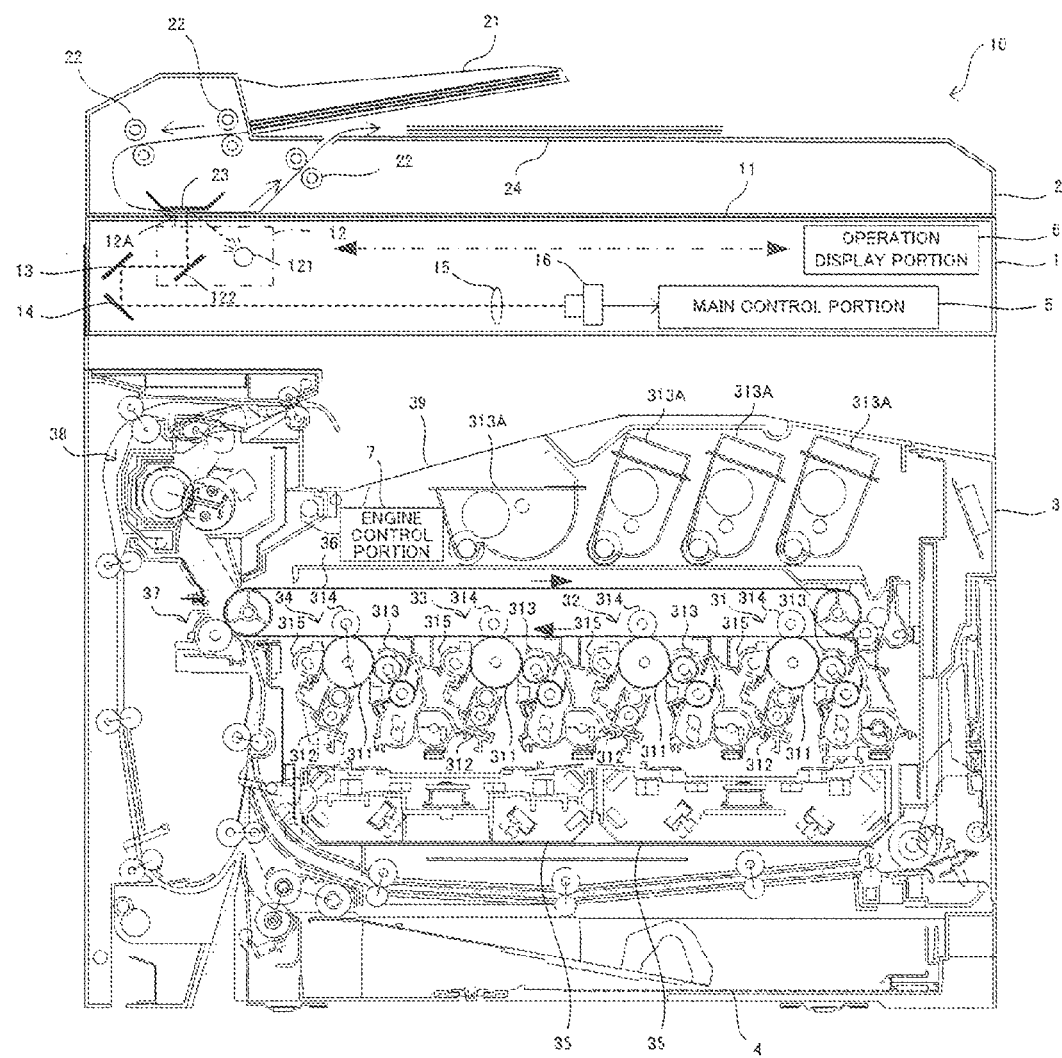
FIG. 1 is a schematic configuration diagram of a multifunction peripheral according to an embodiment of the present disclosure.

As shown in FIG. 1, the multifunction peripheral 10 is an image forming apparatus including an image reading portion 1, an ADF 2, an image forming portion 3, a sheet feed cassette 4, a main control portion 5, an operation display portion 6, an engine control portion 7, and the like. The operation display portion 6 is a touch panel that displays various pieces of information in accordance with a control instruction from the control portion 5 and is used for various types of operation inputs to the control portion 5. In addition, the multifunction peripheral 10 includes a communication modem or the like (not shown) that executes data communication via a communication network such as Internet, whereby a facsimile function or a data communication function using the communication modem is realized by the main control portion 5.

The image reading portion 1 includes a contact glass 11, a reading unit 12, mirrors 13 and 14, an optical lens 15, a CCD (Charge Coupled Device) 16, and the like. The contact glass 11 is provided on the upper surface of the image reading portion 1, and is a transparent document table on which a document sheet is placed as an image reading target of the multifunction peripheral 10. The image reading portion 1 reads image data from the document sheet placed on the contact glass 11, by being controlled by the control portion 5.

The reading unit 12 includes an LED light source 121 and a mirror 122. The reading unit 12 can be moved in a secondary scanning direction in FIG. 1 by a horizontal movement mechanism (not shown) using a drive motor such as a stepping motor. When the reading unit 12 is moved in the secondary scanning direction by the drive motor, scanning in the secondary scanning direction is performed with light radiated onto the contact glass 11 from the LED light source 121.

The LED light source 121 includes multiple white LEDs arranged along a primary scanning direction in FIG. 1. The LED light source 121 radiates one line of white light toward a portion of the document sheet at a reading position 12A on the contact glass 11. It is noted that the reading position 12A moves in the secondary scanning direction along with movement of the reading unit 12 in the secondary scanning direction.

The mirror 122 reflects, toward the mirror 13, light reflected when light is radiated from the LED light source 121 to the portion of the document sheet at the reading position 12A. The light reflected from the mirror 122 is guided to the optical lens 15 by the mirrors 13 and 14. The optical lens 15 concentrates the light entering thereto and causes the concentrated light to enter the CCD 16.

The CCD 16 is a photoelectric conversion element that converts the received light into a voltage corresponding to the light amount thereof and outputs the conversion result as image data. Specifically, the CCD 16 reads image data of the document sheet, based on the light reflected from the document sheet when light is radiated thereto from the LED light source 121. The image data read by the CCD 16 is inputted to the control portion 5.

The ADF 2 is an automatic document feeder including a document sheet set portion 21, a plurality of conveying rollers 22, a document sheet holding portion 23, a sheet discharge portion 24, and the like. The ADF 2 is supported by a housing of the multifunction peripheral 10 in an openable and closable fashion with respect to the contact glass 11.

The ADF 2 drives each of the conveying rollers 22. Then, the document sheet set on the document sheet set portion 21 is conveyed through the reading position 12A on the contact glass 11 to the sheet discharge portion 24. At this time, the image reading portion 1 reads image data from the document sheet passing through the reading position 12A.

The document sheet holding portion 23 is provided above the reading position 12A on the contact glass 11, with an interval provided therebetween so as to allow the document sheet to pass. The document sheet holding portion 23 has a shape elongated in the primary scanning direction, and has a white sheet pasted on its surface on the contact glass 11 side. In the multifunction peripheral 10, image data of the white sheet is read as white reference data.

The image forming portion 3 is an image forming portion that forms an image on a paper sheet based on image data read by the image reading portion 1 or image data inputted from a personal computer.

Specifically, the image forming portion 3 includes a plurality of image forming units 31 to 34, an LSU 35, an intermediate transfer belt 36, a secondary transfer roller 37, a fixing device 38, a sheet discharge tray 39, and the like. It is noted that a print operation by the image forming portion 3 will be described later.

The image forming units 31, 32, 33, and 34 are image forming units of electric photograph type corresponding to C (cyan), M (magenta), Y (yellow), and K (black), respectively. Each of the image forming units 31 to 34 includes a photosensitive drum 311, a charging device 312, a developing device 313, a primary transfer roller 314, a cleaning device 315, and the like.

In addition, the LSU 35 radiates laser light based on image data to each photosensitive drum 311, thereby forming an electrostatic latent image based on the image data, on each photosensitive drum 311.

Further, the image forming portion 3 includes a known separation/contact mechanism (not shown) that causes, among the plurality of the photosensitive drums 311, the photosensitive drum 311 and the transfer roller 314 for each of C, M, and Y, excluding K, to contact the intermediate transfer belt 36 or to be separated therefrom.

<System Configuration>

Next, with reference to a block diagram shown in FIG. 2, the system configuration of the multifunction peripheral 10 will be described.

Figure 2:
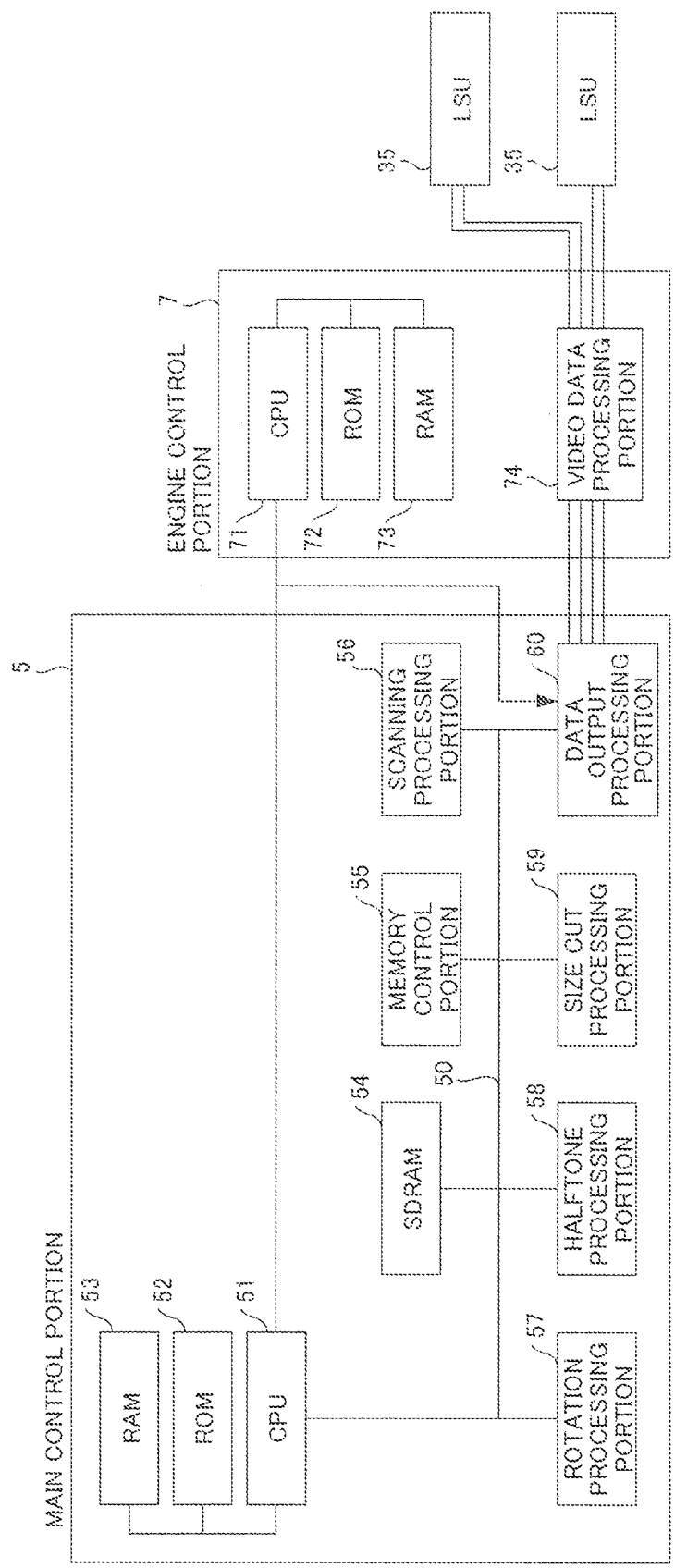
FIG. 2 is a main part block diagram showing the system configuration of the multifunction peripheral according to the embodiment of the present disclosure.

As shown in FIG. 2, the main control portion 5 includes a bus 50, a CPU 51, a ROM 52, a RAM 53, an SDRAM 54, a memory control portion 55, a scanning processing portion 56, a rotation processing portion 57, a halftone processing portion 58, a size cut processing portion 59, a data output processing portion 60, and the like. The bus 50 is a transmission path used for data transmission between the SDRAM 54 and each of the CPU 51, the memory control portion 55, the scanning processing portion 56, the rotation processing portion 57, the halftone processing portion 58, the size cut processing portion 59, and the data output processing portion 60.

The CPU 51 executes a predetermined control program stored in the ROM 52, thereby performing overall control for the multifunction peripheral 10. Specifically, the ROM 52 has stored therein in advance an image processing program that causes a computer such as the CPU 51 to execute image forming processing (see FIG. 4) described later. In addition, the RAM 53 is a volatile storage portion and is used as a temporary storage portion for various types of processing executed by the CPU 51.

It is noted that the image processing program may be stored in a storage medium and may be installed from the storage medium to a storage portion such as a hard disk (not shown) provided in the multifunction peripheral 10. The present disclosure may be understood as disclosure of the image processing program or a computer-readable storage medium having stored therein the image processing program.

The SDRAM 54 is a volatile storage portion such as DDR-SDRAM (Double-Data-Rate Synchronous Dynamic Random Access Memory) connected to the bus 50. The SDRAM 54 is used as a temporary storage portion (working area) for various types of data in the main control portion 5.

The memory control portion 55, the scanning processing portion 56, the rotation processing portion 57, the halftone processing portion 58, the size cut processing portion 59, and the data output processing portion 60 are integrated circuits such as ASIC. It is noted that it is also conceivable that the memory control portion 55, the scanning processing portion 56, the rotation processing portion 57, the halftone processing portion 58, the size cut processing portion 59, and the data output processing portion 60 are partial functions realized by processing performed by an operation unit such as a CPU.

The memory control portion 55 includes a DMA controller that controls reading or writing of data on the SDRAM 54 performed via the bus 50, and the like. In addition, the memory control portion 55 also executes priority control processing, exclusive control processing, and the like about use of the bus 50. For example, it will be assumed that in the memory control portion 55, the priority of the rotation processing portion 57 is set to be lower than the other priorities of the scanning processing portion 56, the halftone processing portion 58, the size cut processing portion 59, and the data output processing portion 60. In this case, the memory control portion 55 prioritizes the scanning processing portion 56, the halftone processing portion 58, the size cut processing portion 59, and the data output processing portion 60 to use the bus 50, and if there is some allowance in the use band of the bus 50, the rotation processing portion 57 is permitted to use the bus 50.

The scanning processing portion 56 acquires image data read by the image reading portion 1 and outputted from the CCD 16. The scanning processing portion 56 performs various types of image processing such as shading correction and gamma correction for the image data. The scanning processing portion 56 is an example of a read image processing portion. The image data processed through the image processing by the scanning processing portion 56 is stored into the SDRAM 54.

The rotation processing portion 57, the halftone processing portion 58, and the size cut processing portion 59 are examples of an image processing portion that performs image processing per data amount equal to or smaller than a predetermined data amount (processing unit amount) of dummy image data described later and outputs the resultant data to the bus 50. For example, each of the rotation processing portion 57, the halftone processing portion 58, and the size cut processing portion 59 performs image processing for color image data stored in the SDRAM 54 per data amount equal to or smaller than the data amount of dummy image data described later. Thus, in the main control portion 5, the SDRAM 54 is shared among various processes. It is noted that in the present embodiment, when color image data or monochrome image data is simply referred to, the data means one page of image data.

Each of the rotation processing portion 57, the halftone processing portion 58, and the size cut processing portion 59 includes a DMA controller that executes writing and reading of image data on a predetermined storage area of the SDRAM 54 via the bus 50, and the like. Reading and writing of image data on the SDRAM 54 by each of the rotation processing portion 57, the halftone processing portion 58, and the size cut processing portion 59 which will be described below are executed by the DMA controller and the like.

The rotation processing portion 57 performs rotation processing per one band of data (an example of a data amount equal to or smaller than a processing unit amount). Specifically, the rotation processing portion 57 acquires data as a rotation target, of color image data stored in the SDRAM 54, from the bus 50, in accordance with a control instruction from the CPU 51. Then, the rotation processing portion 57 performs, for the acquired data, rotation processing of rotating the direction of an image corresponding to the data by 90 degrees or −90 degrees.

Specifically, the rotation processing portion 57 performs rotation processing for image data only for K in the case where document sheet data is monochrome image data, and performs rotation processing for image data for each of C, M, Y, and K in the case where document sheet data is color image data. Thereafter, the rotation processing portion 57 outputs the data processed by the rotation processing to the bus 50 to store the data into the SDRAM 54. It is noted that it is conceivable as another embodiment that the rotation processing portion 57 performs rotation processing for the data per sub-band unit or line unit.

Figure 3:
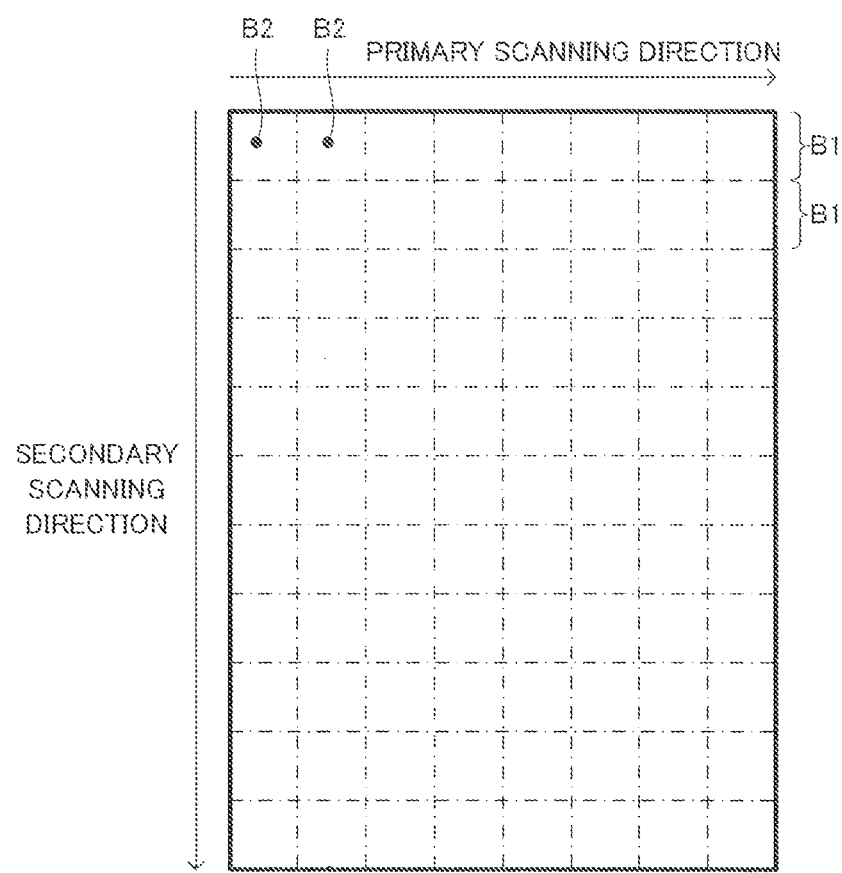
FIG. 3 is a diagram for explaining the concepts of a band and a sub-band in the multifunction peripheral according to the embodiment of the present disclosure.

Here, FIG. 3 is a diagram for explaining the concepts of a band and a sub-band of image data. As shown in FIG. 3, in the multifunction peripheral 10, image data is processed per either a unit of band corresponding to a partial area B1 along each of a plurality of predetermined lines in the secondary scanning direction, or a unit of sub-band corresponding to a partial area B2 obtained by dividing each partial area B1 at predetermined intervals in the primary scanning direction.

The halftone processing portion 58 acquires the color image data processed by the rotation processing and stored in the SDRAM 54, from the bus 50 per band unit, and performs halftone processing for the color image data. Thereafter, the halftone processing portion 58 outputs the color image data processed by the halftone processing to the bus 50, to store the color image data into the SDRAM 54. It is noted that it is conceivable as another embodiment that the halftone processing portion 58 performs the halftone processing for the color image data per sub-band unit.

The size cut processing portion 59 acquires the color image data processed by the halftone processing and stored in the SDRAM 54, from the bus 50 per band unit, and performs size cut processing of deleting unnecessary image data from the color image data. Thereafter, the size cut processing portion 59 outputs the color image data processed by the size cut processing to the bus 50, to store the color image data into the SDRAM 54. It is noted that it is conceivable as another embodiment that the size cut processing portion 59 performs the size cut processing for color image data per sub-band unit or line unit.

The data output processing portion 60 is connected to a video data processing portion 74 provided in the engine control portion 7, which is described later. The data output processing portion 60 acquires the color image data processed by the size cut processing and stored in the SDRAM 54, from the bus 50, and outputs the color image data to the video data processing portion 74 in accordance with a vertical synchronization signal inputted from the video data processing portion 74.

Specifically, in accordance with a vertical synchronization signal inputted for each of image data pieces for C, M, Y, and K included in the color image data, the data output processing portion 60 reads each of the image data pieces for C, M, Y, and K from the SDRAM 54 per one band via the bus 50, and outputs the image data piece to the video data processing portion 74. It is noted that the data output processing portion 60 sequentially outputs pieces of the color image data along the primary scanning direction.

On the other hand, the engine control portion 7 includes a CPU 71, a ROM 72, a RAM 73, the video data processing portion 74, and the like. The CPU 71 is connected to the CPU 51. In addition, the video data processing portion 74 is connected to the data output processing portion 60.

The video data processing portion 74 inputs each vertical synchronization signal to the data output processing portion 60, and thereby acquires each of image data pieces for C, M, Y, and K included in the color image data from the data output processing portion 60. Then, the video data processing portion 74 outputs print data for each color of C, M, Y, and K based on each of the image data pieces for C, M, Y, and K inputted from the data output processing portion 60, to each LSU 35 of the image forming portion 3. Then, in each LSU 35, laser light based on each print data is radiated to the photosensitive drum 311 of each of the image forming portions 31 to 34, whereby an electrostatic latent image corresponding to the color image data piece is formed on each photosensitive drum 311.

The CPU 71 of the engine control portion 7 executes a predetermined control program stored in the ROM 72, thereby controlling the image forming portion 3 to cause the image forming portion 3 to execute an image forming operation. It is noted that the RAM 73 is a volatile storage portion and is used as a temporary storage portion for various processes executed by the CPU 71. The CPU 71 acquires document sheet information indicating the content of image data (hereinafter, referred to as "document sheet data") of a document sheet as a print processing target, from the CPU 51, and executes a color print operation or a monochrome print operation based on the document sheet information.

For example, the document sheet data is image data read by the image reading portion 1, image data inputted from an external personal computer (information processing apparatus), image data stored in advance in a data storage portion such as a hard disk provided in the multifunction peripheral 10, or the like. In addition, the document sheet information indicates the number of pages of monochrome image data and the number of pages of color image data included in the document sheet data, for example.

In the case where the document sheet data is color image data, the CPU 71 executes a color print operation by using the image forming units 31 to 34. In the case where the document sheet data is monochrome image data, the CPU 71 executes a monochrome print operation by using only the image forming unit 34. In the case where the document sheet data is mixed document sheet data including both color image data and monochrome image data, the CPU 71 selects and executes one of the color print operation and the monochrome print operation, that takes a shorter print time than the other. That is, the CPU 71 executes the monochrome print operation either on a predetermined condition that the document sheet data is monochrome image data, or on a predetermined condition that the document sheet data is the mixed document sheet and the monochrome print operation takes a shorter print time than the other.

<Color Print Operation>

Specifically, in the color print operation, the image forming portion 3 is controlled by the CPU 71, to execute print processing by the following procedure. At this time, the CPU 71 inputs the vertical synchronization signals for C, M, Y, and K to the data output processing portion 60, with time lags provided thereamong, which correspond to the placement intervals among the photosensitive drums 311 of the image forming units 31 to 34. Then, in accordance with the vertical synchronization signals for image data pieces for C, M, Y, and K included in the color image data, the data output processing portion 60 outputs the image data pieces for C, M, Y, and K to the video data processing portion 74, with the time lags provided thereamong.

On the other hand, in the image forming portion 3, the photosensitive drum 311 of each of the image forming units 31 to 34 is uniformly charged at a predetermined potential by the charging device 312. Next, light based on the print data for each of C, M, Y, and K inputted from the video data processing portion 74 is radiated onto the surface of each photosensitive drum 311 by the LSU 35. Thus, an electrostatic latent image is formed on the surface of each photosensitive drum 311. Then, the electrostatic latent image on each photosensitive drum 311 is developed (visualized) as a toner image for each color by the developing device 313. It is noted that a toner (developer) is supplied to the developing device 313 from a detachable toner container 313A for each color.

Next, by the primary transfer rollers 314, the toner images on the respective photosensitive drums 311 are sequentially transferred in an overlapping manner onto the intermediate transfer belt 36 which runs in the direction of an arrow shown in the drawing, whereby a color image is formed on the intermediate transfer belt 36. The color image on the intermediate transfer belt 36 is transferred onto a paper sheet fed from the sheet feed cassette 4, by the secondary transfer roller 37. Thereafter, the color image formed on the paper sheet is melted and fixed by the fixing device 38, and the resultant paper sheet is discharged to the sheet discharge portion 39.

<Monochrome Print Operation>

In the monochrome print operation, the image forming portion 3 is controlled by the CPU 71, to execute print processing by the following procedure. At this time, the CPU 71 controls the video data processing portion 74 to cause the video data processing portion 74 to simultaneously input the vertical synchronization signals for C, M, and Y to the data output processing portion 60, and after a lapse of a predetermined time, input the vertical synchronization signal for K to the data output processing portion 60.

Thus, in the case where the document sheet data is suitable for execution of the monochrome print operation, the CPU 71 inputs the vertical synchronization signals that cause image data pieces for C, M, and Y included in the color image data to be outputted simultaneously, to the data output processing portion 60. Here, the CPU 71 executing this processing corresponds to a synchronization signal input portion. Thus, in accordance with the vertical synchronization signals for image data pieces for C, M, Y, and K, the data output processing portion 60 simultaneously outputs the image data pieces for C, M, and Y to the video data processing portion 74, and after a lapse of a predetermined time, outputs the image data piece for K to the video data processing portion 74.

On the other hand, the CPU 71 drives the separation/contact mechanism (not shown) of the image forming portion 3, to separate the photosensitive drums 311 and the transfer rollers 314 of the image forming units 31 to 33 for C, M, and Y from the intermediate transfer belt 36.

Then, in the image forming portion 3, the photosensitive drum 311 of the other image forming unit 34 is uniformly charged at a predetermined potential by the charging device 312. Next, light based on the image data is radiated onto the surface of the photosensitive drum 311 of the image forming unit 34 by the LSU 35. Thus, an electrostatic latent image is formed on the surface of the photosensitive drum 311. Then, the electrostatic latent image on the photosensitive drum 311 of the image forming unit 34 is developed (visualized) as a toner image by the developing device 313.

Next, by the primary transfer roller 314, the toner image on the photosensitive drum 311 is transferred onto the intermediate transfer belt 36 which runs in the direction of the arrow shown in the drawing, whereby the toner image for black is formed on the intermediate transfer belt 36. Then, the toner image for black on the intermediate transfer belt 36 is transferred onto a paper sheet fed from the sheet feed cassette 4 by the secondary transfer roller 37. Thereafter, the color image formed on the paper sheet is melted and fixed by the fixing device 38, and the resultant paper sheet is discharged to the sheet discharge portion 39.

In the multifunction peripheral 10 thus configured, in the case where document sheet data is mixed document sheet data including both monochrome image data and color image data, one of the monochrome print operation and the color print operation is selected by the CPU 71 so as to reduce the print time as much as possible. That is, even if document sheet data is monochrome image data, the color print operation can be executed by the CPU 71.

Therefore, in the multifunction peripheral 10, by execution of the below-described image forming processing by the CPU 51, in the case where document sheet data is monochrome image data, the monochrome image data is converted into color image data to which dummy image data pieces for C, M, and Y have been added. Thus, even if document sheet data is monochrome image data, color image data is always inputted to the engine control portion 7.

<Image Forming Processing>

Figure 4:
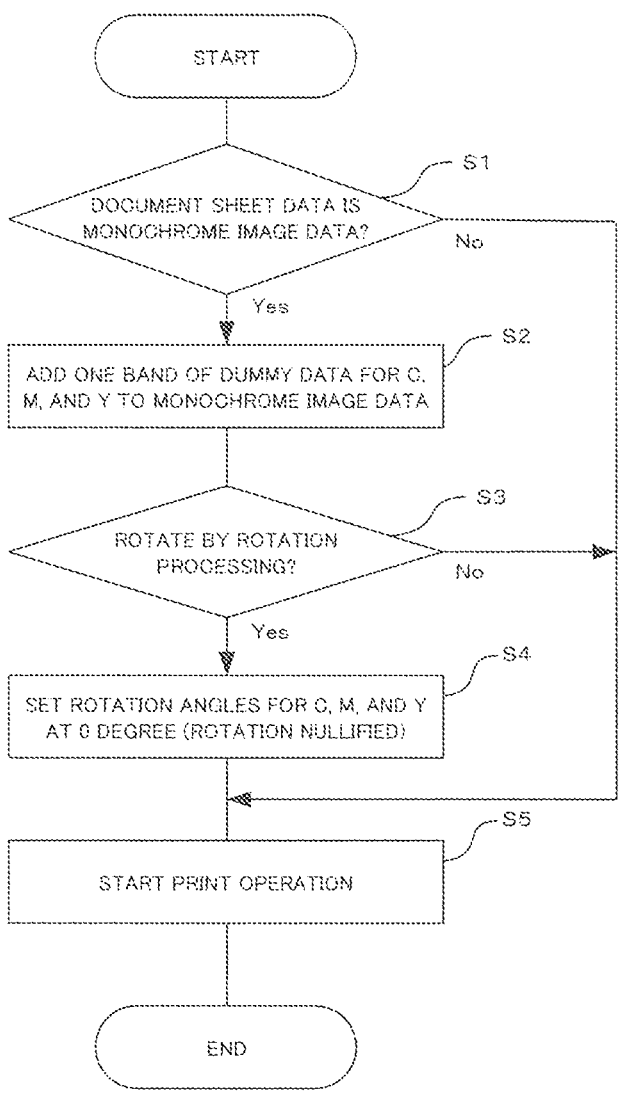
FIG. 4 is a flowchart for explaining an example of the procedure of image forming processing executed by the multifunction peripheral according to the embodiment of the present disclosure.

Hereinafter, with reference to FIGS. 4 and 5, image forming processing executed by the CPU 51 in the multifunction peripheral 10 will be described. It is noted that the numbers of processing steps executed by the CPU 51 are denoted by steps S1, S2, . . . .

The image forming processing is executed by the CPU 51 when a print request has been received from an information processing apparatus such as an external personal computer, for example. It is noted that the print request includes, as document sheet data, monochrome image data for only K, or color image data including image data pieces for C, M, Y, and K. It is noted that in the multifunction peripheral 10, the CPU 51 can execute various types of jobs such as scanning processing or facsimile transmission processing using the image reading portion 1, in parallel with the image forming processing.

(Step S1)

First, in step S1, the CPU 51 determines whether or not the document sheet data included in the print request is monochrome image data. Here, this processing step corresponds to a determination step. Here, if the CPU 51 has determined that the document sheet data is monochrome image data (Yes in S1), the CPU 51 shifts the process to step S2. On the other hand, if the CPU 51 has determined that the document sheet data is color image data (No in S1), the CPU 51 shifts the process to step S5. It is noted that in the case where the document sheet data is mixed document sheet data including both monochrome image data and color image data, the following steps S2 to S4 are executed for only the monochrome image data.

(Step S2)

In step S2, the CPU 51 adds, to the monochrome image data, dummy image data pieces for C, M, and Y corresponding to one predetermined band (an example of processing unit amount) which corresponds to a part of the monochrome image data, thereby converting the monochrome image data into color image data. Then, the CPU 51 outputs the color image data to the bus 50, to store the color image data into the SDRAM 54. It is noted that the densities of all pixels of the dummy image data are zero. Here, the CPU 51 executing this processing corresponds to an adding portion, and this processing step corresponds to an adding step. It is noted that the processing of step S2 may be executed by an integrated circuit such as an ASIC. In this case, the integrated circuit corresponds to the adding portion.

In the case where each of the rotation processing portion 56, the halftone processing portion 57, the size cut processing portion 58, and the data output processing portion 60 processes data per sub-band unit, a dummy image data piece corresponding to one sub-band or one band may be added to the monochrome image data. In the case where each of the rotation processing portion 56, the halftone processing portion 57, the size cut processing portion 58, and the data output processing portion 60 processes data per one line unit, a dummy image data piece corresponding to one line, one sub-band, or one band (an example of processing unit amount) may be added to the monochrome image data. That is, the image processing portions such as the rotation processing portion 56, the halftone processing portion 57, and the size cut processing portion 58 perform image processing per data amount equal to or smaller than the data amount (processing unit amount) of the dummy image data piece.

(Step S3)

In step S3, the CPU 51 determines whether or not rotation processing needs to be performed for the monochrome image data by the rotation processing portion 57. For example, in the case where the direction of the document sheet corresponding to the monochrome image data is different from the direction of a designated print paper sheet, the CPU 51 determines that the rotation processing needs to be performed. More specifically, in the case where the monochrome image data is A4 image data in landscape direction and the designated print paper sheet is A4 in portrait direction, the CPU 51 determines that the rotation processing needs to be performed.

Here, if the CPU 51 has determined that the rotation processing is needed (Yes in S3), the CPU 51 shifts the process to step S4. On the other hand, if the CPU 51 has determined that the rotation processing is needed (No in S3), the CPU 51 shifts the process to step S5.

(Step S4)

Next, in step S4, the CPU 51 sets the angle of the rotation processing performed by the rotation processing portion 57 at 0 degree, for the dummy image data pieces for C, M, and Y of the color image data generated in step S2. That is, the CPU 51 nullifies the rotation of each of the dummy image data pieces. Here, the CPU 51 executing this processing corresponds to a rotation nullifying portion, and this processing step corresponds to a rotation nullifying step. Then, the CPU 51 notifies the rotation processing portion 57 of a setting content about whether or not to perform the rotation processing. Thus, the rotation processing portion 57 rotates only the image data for K by 90 degrees or −90 degrees without rotating the dummy image data pieces for C, M, and Y. Therefore, the output periods of the dummy image data pieces are brought together into one period.

Specifically, the rotation processing portion 57 reads only the image data for K of the color image data including the dummy image data pieces added thereto, from the SDRAM 54, performs rotation processing for only the image data for K, and stores the processed data into the SDRAM 54. Alternatively, it is also conceivable that after the CPU 51 has inputted the monochrome image data inputted as document sheet data, to the rotation processing portion 57, and has caused the rotation processing portion 57 to perform rotation processing, the CPU 51 stores color image data including the monochrome image data and the dummy image data into the SDRAM 54. It is noted that it is also conceivable that the rotation processing portion 57 reads the color image data from the SDRAM 54, performs rotation processing for only the monochrome image data without performing rotation processing for the dummy image data pieces, and then stores the monochrome image data and the dummy image data pieces into the SDRAM 54 again.

(Step S5)

In step S5, the CPU 51 starts a print operation in the multifunction peripheral 10. Specifically, the CPU 51 operates the rotation processing portion 57, the halftone processing portion 58, and the size cut processing portion 59 to execute various types of image processing for the color image data stored in the SDRAM 54.

The CPU 51 transmits the document sheet information to the CPU 71 of the engine control portion 7 and notifies the CPU 71 to start the print operation. Thus, the CPU 71 selectively executes one of the color print operation and the monochrome print operation, based on the document sheet information, as described above.

Figure 5A:
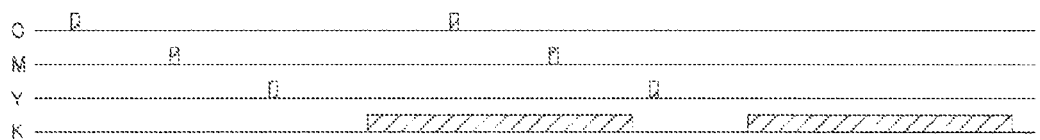
FIG. 5A is a diagram for explaining an example of a print operation executed by the multifunction peripheral according to the embodiment of the present disclosure in the case where document sheet data is monochrome image data.
Figure 5B:
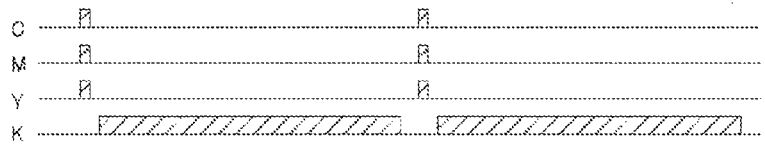
FIG. 5B is a diagram for explaining an example of the print operation executed by the multifunction peripheral according to the embodiment of the present disclosure in the case where document sheet data is monochrome image data.

Here, FIG. 5 is a diagram for explaining an example of the print operation in the case where the document sheet data is monochrome image data. FIG. 5A shows an output timing of image data in the case where the color print operation is executed, and FIG. 5B shows an output timing of image data in the case where the monochrome print operation is executed.

In the case where the document sheet data is monochrome image data and the color print operation is executed, the video data processing portion 74 of the engine control portion 7 outputs the vertical synchronization signals for C, M, Y, and K to the data output processing portion 60 with predetermined intervals provided thereamong. Thus, as shown in FIG. 5A, the data output processing portion 60 reads the image data pieces for C, M, Y, and K from the SDRAM 54 and outputs them to the video data processing portion 74, at timings shifted from each other by the predetermined intervals in accordance with the vertical synchronization signals.

Figure 7A:
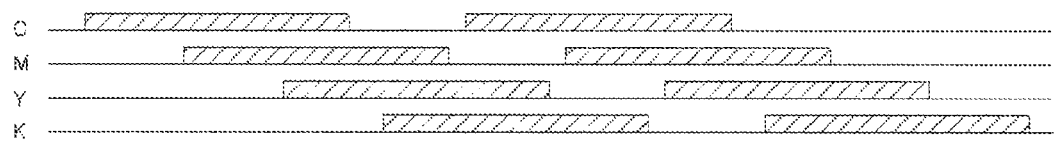
FIG. 7A is a diagram for explaining a conventional example of a print operation in the case where document sheet data is monochrome image data.

Here, as described above, each of the dummy image data pieces for C, M, and Y added to the monochrome image data is data corresponding to one band. Therefore, as shown in FIG. 5A, in the color print operation, the output timings of the image data piece for K and the dummy image data pieces for C, M, and Y, included in the one color image data set do not overlap with each other. It is noted that in the case where color image data sets are continuously outputted, the output timing of the image data piece for K overlaps with the output timings of the next dummy image data pieces for C, M, and Y. However, since each dummy image data piece for C, M, and Y is only one band of data, the use band of the bus 50 can be reduced as compared to the case where dummy image data pieces for C, M, and Y corresponding to one page are added to the monochrome image data (see FIG. 7A).

In the case where the document sheet data is monochrome image data and the monochrome print operation is executed, the video data processing portion 74 of the engine control portion 7 simultaneously outputs the vertical synchronization signals for C, M, and Y to the data output processing portion 60. Then, after a lapse of a predetermined time, the video data processing portion 74 outputs the vertical synchronization signal for K to the data output processing portion 60. Thus, as shown in FIG. 5B, the data output processing portion 60 simultaneously outputs the image data pieces for C, M, and Y to the video data processing portion 74 in accordance with the vertical synchronization signals, and after a lapse of the predetermined time, outputs the image data piece for K to the video data processing portion 74.

Figure 7B:
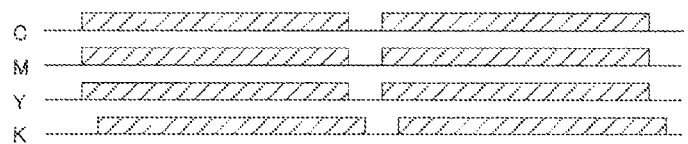
FIG. 7B is a diagram for explaining a conventional example of the print operation in the case where document sheet data is monochrome image data.

Here, as described above, each of the dummy image data pieces for C, M, and Y added to the monochrome image data is data corresponding to one band. Therefore, as shown in FIG. 5B, in the monochrome print operation, the dummy image data pieces for C, M, and Y are outputted during the initial short period, and thereafter, only the image data piece for K is outputted. Therefore, the use band of the bus 50 can be reduced as compared to the case where dummy image data pieces for C, M, and Y corresponding to one page are added to the monochrome image data (see FIG. 7B).

Particularly, in FIG. 5B, since the image data piece for K is outputted the predetermined time later than the dummy image data pieces for C, M, and Y, not all the output timings of the image data pieces for C, M, Y, and K overlap. Therefore, it is desirable that the predetermined time is a time set in advance as a time at least required for outputting each dummy image data piece for C, M, and Y corresponding to one band. It is noted that the video data processing portion 74 can also input the vertical synchronization signals to the data output processing portion 60 so as to simultaneously output all the image data pieces for C, M, Y, and K.

In the above image forming processing (see FIG. 4), even in the case where the monochrome image data needs rotation processing, rotation processing is not executed for the dummy image data pieces for C, M, and Y. Therefore, the dummy image data pieces are outputted during the initial short period by the data output processing portion 60. Therefore, a time during which the band of the bus 50 is used for outputting the dummy image data pieces can be reduced.

As described above, according to the multifunction peripheral 10, since the dummy image data piece is only one band of data, the use band of the bus 50 when the color image data including the dummy image data pieces is outputted via the bus 50 can be reduced. Therefore, for example, even in the case where the monochrome print operation and scanning processing of reading image data from a document sheet by using the image reading apparatus 1 are executed in parallel, shortage of the band of the bus 50 can be prevented, and therefore occurrence of error such as buffer underrun can be prevented.

Particularly, in the scanning processing, ACS determination processing which determines whether a document sheet is a color document sheet or a monochrome document sheet may be executed by the scanning processing portion 56. In this ACS determination, image data read from the document sheet is compressed into JPEG format and then stored into the SDRAM 54. Next, the image data is read from the SDRAM 54, ACS determination is executed for the image data, and then the image data is compressed into JPEG format again and stored into the SDRAM 54. Therefore, in the case where the ACS determination processing is executed, the band of the bus 50 is particularly pressed by the scanning processing. However, in the multifunction peripheral 10, since the use band of the bus 50 upon the monochrome print operation is reduced, the scanning processing including the ACS determination processing can be normally executed in parallel with the monochrome print operation.

Other Embodiments

In the above embodiment, the case where, if the monochrome image data needs rotation processing (Yes in S3), the rotation angles of the dummy image data pieces for C, M, and Y are set at 0 degree (S4), has been described as an example. Alternatively, it is also conceivable that processing of steps S3 and S4 is omitted.

Figure 6A:
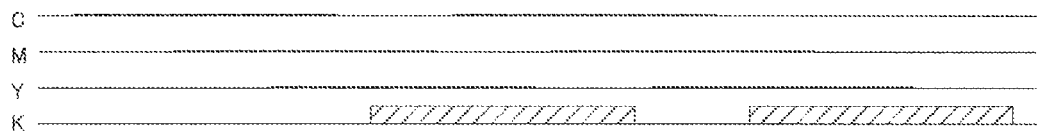
FIG. 6A is a diagram for explaining another example of the print operation executed by the multifunction peripheral according to the embodiment of the present disclosure in the case where document sheet data is monochrome image data.

In this case, if the monochrome image data needs rotation processing, rotation processing is similarly performed also for the dummy image data pieces for C, M, and Y by the rotation processing portion 57. Here, FIG. 6 is a diagram for explaining another example of the print operation in the case where the document sheet data is monochrome image data. FIG. 6A shows an output timing of image data in the case where the color print operation is executed, and FIG. 6B shows an output timing of image data in the case where the monochrome print operation is executed.

As shown in FIG. 6A, in the case where rotation processing has been performed for the dummy image data pieces for C, M, and Y, in the color print operation, the dummy image data pieces for C, M, and Y are each gradually outputted from the data output processing portion 60 at the start or the end of the primary scanning direction. Therefore, a timing at which the image data pieces for C, M, Y, and K are simultaneously outputted, arises. However, since each dummy image data piece is one band of image data, even if the image data pieces for C, M, Y, and K are simultaneously outputted, the use band of the bus 50 can be reduced as compared to the case where dummy image data pieces corresponding to one page are added (see FIG. 7A).

Figure 6B:
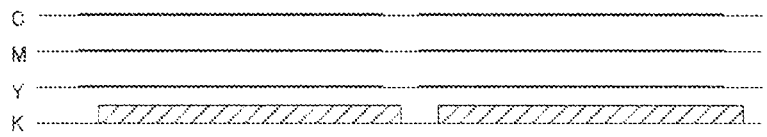
FIG. 6B is a diagram for explaining another example of the print operation executed by the multifunction peripheral according to the embodiment of the present disclosure in the case where document sheet data is monochrome image data.

In addition, similarly, as shown in FIG. 6B, in the case where rotation processing has been performed for the dummy image data pieces for C, M, and Y, in the monochrome print operation, the dummy image data pieces for C, M, and Y are each gradually outputted from the data output processing portion 60 at the start or the end of the primary scanning direction. Therefore, a timing at which the image data pieces for C, M, Y, and K are simultaneously outputted, arises during a long period. However, since each dummy image data piece is one band of image data, even if the image data pieces for C, M, Y, and K are simultaneously outputted, the use band of the bus 50 can be reduced as compared to the case where dummy image data pieces corresponding to one page are added (see FIG. 7B).

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
    a bus through which data is transmitted;
    an adding portion that, in the case where document sheet data as a processing target is monochrome image data, outputs, to the bus, color image data obtained by adding, to the monochrome image data, dummy image data pieces for a plurality of colors each corresponding to a predetermined processing unit amount which corresponds to a part of the monochrome image data;
    an image processing portion that performs image processing per data amount equal to or smaller than the processing unit amount and outputs the resultant data to the bus; and
    an output processing portion that outputs image data pieces for the plurality of colors included in the color image data processed by the image processing portion and acquired from the bus, in accordance with synchronization signals inputted for the respective image data pieces for the plurality of colors,
    wherein the image processing portion includes a rotation processing portion that performs rotation processing per one band of data,
    the image processing apparatus further comprising a rotation nullifying portion that nullifies the rotation processing by the rotation processing portion for each dummy image data piece.

2. The image processing apparatus according to claim 1, wherein the processing unit amount is one line, one band, or one sub-band.

3. The image processing apparatus according to claim 1, further comprising a synchronization signal input portion that, in the case where the document sheet data as the processing target satisfies a predetermined condition, inputs, to the output processing portion, the synchronization signal that causes at least the dummy image data pieces for the plurality of colors to be simultaneously outputted.

4. The image processing apparatus according to claim 1, wherein the image processing portion performs image processing for color image data acquired from the bus, per data amount equal to or smaller than the processing unit amount.

5. The image processing apparatus according to claim 1, further comprising a storage portion connected to the bus, wherein
the adding portion outputs the color image data to the bus, to store the color image data into the storage portion,
the image processing portion acquires the color image data from the storage portion via the bus, and outputs the color image data processed by the image processing portion to the bus, to store the color image data into the storage portion and
the output processing portion outputs, from the bus, the image data pieces for a plurality of colors acquired from the storage portion via the bus.

6. The image processing apparatus according to claim 1, further comprising:
an image reading portion that reads image data from a document sheet; and
a read image processing portion that performs image processing for the image data read by the image reading portion and outputs the resultant image data to the bus.

7. An image processing method executed by a computer provided in an image processing apparatus that includes: a bus through which data is transmitted; an image processing portion that performs image processing per data amount equal to or smaller than a predetermined processing unit amount and outputs the resultant data to the bus; and an output processing portion that outputs image data pieces for a plurality of colors included in color image data processed by the image processing and acquired from the bus, in accordance with synchronization signals inputted for the respective image data pieces for the plurality of colors, the image processing method comprising:
a determination step of determining whether or not the document sheet data as a processing target is monochrome image data; and
an adding step of, in the case where it is determined that the document sheet data is monochrome image data, outputting, to the bus, color image data obtained by adding, to the monochrome image data, dummy image data pieces for a plurality of colors each corresponding to the processing unit amount which corresponds to a part of the monochrome image data,
wherein the image processing portion includes a rotation processing portion that performs rotation processing per one band of data,
the image processing method further comprising a rotation nullifying step of nullifying the rotation processing by the rotation processing portion for each dummy image data piece.

* * * * *